United States Patent
Kim et al.

(10) Patent No.: US 10,745,549 B2
(45) Date of Patent: Aug. 18, 2020

(54) METHOD OF PREPARING RUBBER COMPOSITION INCLUDING SYNDIOTACTIC 1,2-POLYBUTADIENE

(71) Applicant: Korea Kumho Petrochemical Co., Ltd., Seoul (KR)

(72) Inventors: Jae Yun Kim, Daejeon (KR); Yeong Min Jung, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 126 days.

(21) Appl. No.: 16/012,123

(22) Filed: Jun. 19, 2018

(65) Prior Publication Data

US 2018/0362753 A1    Dec. 20, 2018

(30) Foreign Application Priority Data

Jun. 19, 2017 (KR) .................. 10-2017-0077267

(51) Int. Cl.
 *C08L 47/00* (2006.01)
 *C08F 36/04* (2006.01)
 (Continued)

(52) U.S. Cl.
 CPC ............ *C08L 47/00* (2013.01); *B60C 1/0016* (2013.01); *C08C 19/24* (2013.01); *C08C 19/26* (2013.01); *C08C 19/44* (2013.01); *C08F 4/461* (2013.01); *C08F 4/52* (2013.01); *C08F 36/045* (2013.01); *C08F 36/06* (2013.01); *C08F 36/08* (2013.01); *C08F 136/06* (2013.01); *C08F 236/10* (2013.01); *C08L 7/00* (2013.01); *C08L 15/00* (2013.01); *C08F 2500/16* (2013.01); *C08F 2800/20* (2013.01); *C08L 2207/10* (2013.01)

(58) Field of Classification Search
 CPC ............... C08L 47/00; C08L 2205/025; C08L 2207/10; C08L 2314/08; C08F 36/04
 See application file for complete search history.

(56) References Cited

U.S. PATENT DOCUMENTS 5,064,910 A * 11/1991 Hattori .................... C08C 19/00
                                                        525/359.1
5,268,439 A * 12/1993 Hergenrother ........ C07F 7/2288
                                                            526/340
(Continued)

FOREIGN PATENT DOCUMENTS

JP        2003-519263 A    6/2003
KR   10-2012-0098797 A    9/2012

*Primary Examiner* — Caixia Lu
(74) *Attorney, Agent, or Firm* — Novick, Kim & Lee, PLLC; Jae Youn Kim

(57) ABSTRACT

According to an embodiment of the present invention, there is provided a method of preparing a rubber composition, which includes (a) synthesizing a living polymer by solution polymerization of a monomer mixture including a conjugated diene-based monomer in the presence of a first catalyst; (b) reacting some ends of the living polymer with a coupling agent; (c) reacting the remaining ends of the living polymer with an organotin halide compound to prepare an end-modified conjugated diene-based polymer solution; and (d) adding a second catalyst and a conjugated diene-based monomer to the end-modified conjugated diene-based polymer solution to induce solution polymerization.

15 Claims, 1 Drawing Sheet

(51) Int. Cl.
*C08F 36/06* (2006.01)
*C08F 4/48* (2006.01)
*C08F 4/46* (2006.01)
*C08F 4/52* (2006.01)
*B60C 1/00* (2006.01)
*C08F 36/08* (2006.01)
*C08C 19/44* (2006.01)
*C08L 7/00* (2006.01)
*C08F 236/10* (2006.01)
*C08L 15/00* (2006.01)
*C08C 19/26* (2006.01)
*C08F 136/06* (2006.01)
*C08C 19/24* (2006.01)

(56) References Cited

U.S. PATENT DOCUMENTS

| 2001/0012878 A1* | 8/2001 | Luo | C08F 4/70 |
| | | | 526/139 |
| 2016/0009903 A1* | 1/2016 | Morita | B60C 1/00 |
| | | | 525/332.9 |

\* cited by examiner

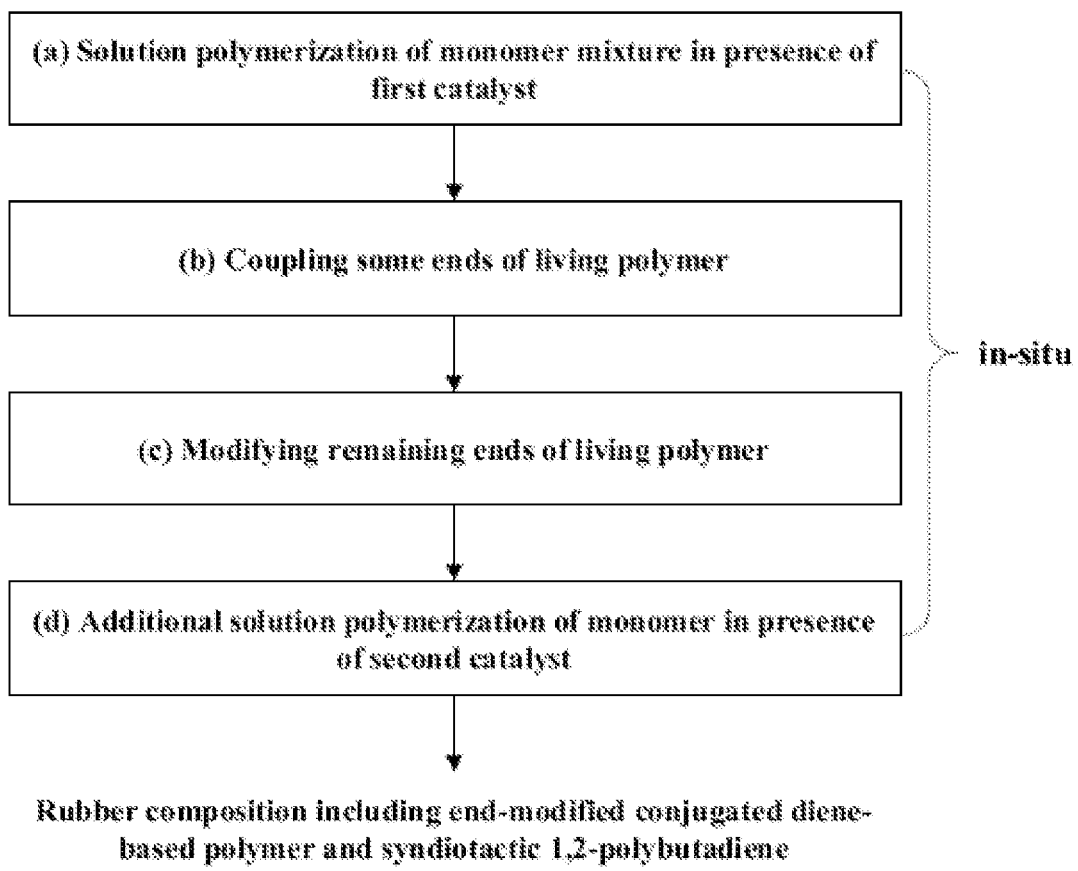

METHOD OF PREPARING RUBBER COMPOSITION INCLUDING SYNDIOTACTIC 1,2-POLYBUTADIENE

CROSS-REFERENCE TO RELATED APPLICATION

This application claims priority to and the benefit of Korean Patent Application No 10-2017-0077267, filed on Jun. 19, 2017, the disclosure of which is incorporated herein by reference in its entirety.

BACKGROUND

1. Field of the Invention

The present invention relates to a method of preparing a rubber composition including syndiotactic 1,2-polybutadiene, and more particularly, to a method of preparing a rubber composition including syndiotactic 1,2-polybutadiene dispersed in a base rubber consisting of an end-modified conjugated diene-based polymer.

2. Discussion of Related Art

Syndiotactic 1,2-polybutadiene is a crystalline polymer with a stereoregular structure in which a vinyl group of the side chain alternate on two opposing sides of the main chain of a polymer. Syndiotactic 1,2-polybutadiene is a unique material in that it exhibits the properties of both plastic and rubber, and thus is applied in various fields. For example, syndiotactic 1,2-polybutadiene may be used to manufacture a film, a fiber, and various molded articles, and may also be used in combination with a natural or synthetic rubber.

It is widely known that a blend of a crystalline polymer and a rubber can improve the properties of a material into which the blend is mixed. For example, when syndiotactic 1,2-polybutadiene is mixed with a rubber composition for tire tread, heat generation is reduced so that fuel efficiency of the tire can be improved.

The blend of a crystalline polymer and a rubber is prepared using a common mixing device such as a mixer, an extruder, or a kneader. However, in this case, there is a problem of a cost increase, degradation and crosslinking of a polymer, inappropriate mixing, and processability degradation, and particularly, the degradation and crosslinking of a polymer, which are caused by the high vinyl content of syndiotactic 1,2-polybutadiene, may impede the high-temperature mixing of syndiotactic 1,2-polybutadiene and a rubber.

For this reason, a method of preparing a blend of rubber cement and syndiotactic 1,2-polybutadiene by polymerizing 1,3-butadiene in rubber cement in the presence of a predetermined catalyst to form syndiotactic 1,2-polybutadiene has been proposed, but there is still a problem of inefficiency and toxicity of the catalyst.

In addition, when the blend thus prepared is used in combination with a reinforcing filler such as carbon black, dispersibility of the reinforcing filler is degraded due to a low affinity and compatibility of rubber cement for the reinforcing filler, and accordingly, it is difficult to harmoniously implement mechanical properties according to the reinforcing filler and fuel efficiency according to syndiotactic 1,2-polybutadiene.

SUMMARY OF THE INVENTION

The present invention is designed to solve the problems of the prior art, and it is an object of the present invention to provide a method of preparing a rubber composition including syndiotactic 1,2-polybutadiene, which has improved compatibility and affinity for a reinforcing filler and thus is capable of improving the properties of a product by including a reinforcing filler.

According to one aspect of the present invention, there is provided a method of preparing a rubber composition, which includes (a) synthesizing a living polymer by solution polymerization of a monomer mixture including a conjugated diene-based monomer in the presence of a first catalyst; (b) reacting some ends of the living polymer with a coupling agent; (c) reacting the remaining ends of the living polymer with an organotin halide compound to prepare an end-modified conjugated diene-based polymer solution; and (d) adding a second catalyst and a conjugated diene-based monomer to the end-modified conjugated diene-based polymer solution to induce solution polymerization.

According to an embodiment, the conjugated diene-based monomer may be one or more selected from the group consisting of 1,3-butadiene, 2,3-dimethyl-1,3-butadiene, piperylene, 3-butyl-1,3-octadiene, isoprene, and 2-phenyl-1,3-butadiene.

According to an embodiment, the monomer mixture may further include an aromatic vinyl monomer.

According to an embodiment, the aromatic vinyl monomer may be one or more selected from the group consisting of styrene, α-methylstyrene, 3-methylstyrene, 4-methylstyrene, 2,4-dimethylstyrene, 2,4-diisopropylstyrene, 4-propylstyrene, 1-vinylnaphthalene, 4-cyclohexylstyrene, 4-(p-methylphenyl)styrene, N,N-dimethylaminoethylstyrene, and 1-vinyl-5-hexylnaphthalene.

According to an embodiment, the first catalyst may be one or more selected from the group consisting of an organolithium compound, an organosodium compound, an organopotassium compound, an organorubidium compound, and an organocesium compound.

According to an embodiment, in the step (b), 10 to 40% of the ends of the living polymer may be reacted with the coupling agent.

According to an embodiment, the coupling agent may be one or more selected from the group consisting of tin tetrachloride, silicon tetrachloride, and a silicon alkoxide.

According to an embodiment, the organotin halide compound may be one or more selected from the group consisting of trimethyltin chloride, dibutyltin dichloride, tributyltin chloride, and phenyltin trichloride.

According to an embodiment, the second catalyst may include an organoaluminum compound, a phosphorus compound, and a transition metal complex.

According to an embodiment, the second catalyst may include 15 to 40 equivalents of the organoaluminum compound and 1 to 15 equivalents of the phosphorus compound with respect to 1 equivalent of the transition metal complex.

According to an embodiment, the organoaluminum compound may be one or more selected from the group consisting of trimethylaluminum, triethylaluminum, tripropylaluminum, tributylaluminum, triisobutylaluminum, trihexylaluminum, and diisobutylaluminum hydride.

According to an embodiment, the phosphorus compound may be a phosphite, a phosphate, or a mixture thereof.

According to an embodiment, the transition metal complex may be an iron carboxylate or iron acetylacetonate.

According to an embodiment, the steps (a) to (d) may be carried out in situ.

According to an embodiment, a product of the step (d) may include 60 to 90 wt % of an end-modified conjugated diene-based polymer and 10 to 40 wt % of syndiotactic 1,2-polybutadiene.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a schematic diagram of a method of preparing a rubber composition according to one aspect of the present invention.

DETAILED DESCRIPTION OF EXEMPLARY EMBODIMENTS

Hereinafter, exemplary embodiments of the present invention will be described in detail with reference to the accompanying drawings so that those of ordinary skill in the art can carry out the present invention. However, it should be understood that the present invention can be implemented in various forms, and is not intended to limit the exemplary embodiments of the present invention. Also, in the drawings, descriptions of parts unrelated to the detailed description are omitted to clearly describe the present invention. Throughout the specification, like numbers refer to like elements, and descriptions of the same elements will be not reiterated. Throughout the specification, a certain part being "connected" to another part means the certain part "being directly connected" to the other part or "being indirectly connected" to the other part through another member interposed between the two parts. Also, a certain part "including" a certain element signifies that the certain part may further include, instead of excluding, another element unless particularly indicated otherwise.

FIG. 1 is a schematic diagram of a method of preparing a rubber composition according to one aspect of the present invention.

Referring to FIG. 1, a method of preparing a rubber composition according to one aspect of the present invention may include (a) synthesizing a living polymer by solution polymerization of a monomer mixture including a conjugated diene-based monomer in the presence of a first catalyst; (b) reacting some ends of the living polymer with a coupling agent; (c) reacting the remaining ends of the living polymer with an organotin halide compound to prepare an end-modified conjugated diene-based polymer solution; and (d) adding a second catalyst and a conjugated diene-based monomer to the end-modified conjugated diene-based polymer solution to induce solution polymerization.

In the step (a), a living polymer may be synthesized by solution polymerization of a monomer mixture including a conjugated diene-based monomer in the presence of a first catalyst. The solution polymerization is a method of polymerizing and/or copolymerizing one or more monomers using a predetermined type of a solvent as a polymerization medium in the presence of a catalyst. For example, the solvent may be one selected from the group consisting of aliphatic hydrocarbons, alicyclic hydrocarbons, aromatic hydrocarbons, and a mixture of two or more thereof, preferably, one selected from the group consisting of n-pentane, n-hexane, n-heptane, isooctane, cyclohexane, toluene, benzene, xylene, and a mixture of two or more thereof, and is more preferably n-heptane, but the present invention is not limited thereto.

The first catalyst may be one or more selected from the group consisting of an organolithium compound, an organosodium compound, an organopotassium compound, an organorubidium compound, and an organocesium compound, is preferably an organolithium compound, and more preferably an alkyllithium compound having a C3 to C10 alkyl group.

For example, the alkyllithium compound may be one or more selected from the group consisting of methyllithium, ethyllithium, isopropyllithium, n-butyllithium, sec-butyllithium, and tert-butyllithium, and is preferably n-butyllithium or sec-butyllithium, but the present invention is not limited thereto.

A usage amount of the organometallic compound may vary depending on a desired molecular weight of a polymer to be produced, but the organometallic compound may be commonly used in an amount of 0.01 to 1 g, preferably, 0.03 to 0.1 g, with respect of 100 g of the monomer.

In the step (a), an initiation temperature of the solution polymerization may be about 0 to 60° C., preferably, about 20 to 50° C. When the initiation temperature is less than 0° C., the viscosity of a solution rapidly increases as the polymerization is progressed, and thus a reaction rate decreases, resulting in poor economic feasibility, and when the initiation temperature is greater than 60° C., it may be difficult to adjust a reaction temperature. Also, a reaction pressure may be 1 to 10 kgf/cm$^2$. The solution polymerization may be carried out for an enough time to convert all monomers into a polymer or copolymer, that is, for 20 to 200 minutes until a desired conversion ratio is reached.

The conjugated diene-based monomer may be one or more selected from the group consisting of 1,3-butadiene, 2,3-dimethyl-1,3-butadiene, piperylene, 3-butyl-1,3-octadiene, isoprene, and 2-phenyl-1,3-butadiene, and is preferably 1,3-butadiene, but the present invention is not limited thereto. When the conjugated diene-based monomer is 1,3-butadiene, the living polymer may be based on polybutadiene, for example, 1,4-polybutadiene.

The monomer mixture may further include an aromatic vinyl monomer. The aromatic vinyl monomer may be one or more selected from the group consisting of styrene, α-methylstyrene, 3-methylstyrene, 4-methylstyrene, 2,4-dimethylstyrene, 2,4-diisopropylstyrene, 4-propylstyrene, 1-vinylnaphthalene, 4-cyclohexylstyrene, 4-(p-methylphenyl)styrene, N,N-dimethylaminoethylstyrene, and 1-vinyl-5-hexylnaphthalene, and is preferably styrene, but the present invention is not limited thereto. When the monomer mixture includes the conjugated diene-based monomer and the aromatic vinyl monomer, for example, 1,3-butadiene and styrene, the living polymer may be based on a styrene-butadiene copolymer. Also, when a mixture of the conjugated diene-based monomer and the aromatic vinyl monomer is used, the conjugated diene-based monomer and the aromatic vinyl monomer may be mixed at a ratio of 55 to 95 wt %:5 to 45 wt %.

In addition, in the step (a), the reaction rate of polymerization or the microstructure of a polymer may be adjusted using a predetermined type of a Lewis base. For example, the Lewis base may be one or more selected from the group consisting of tetrahydrofuran, di-n-propyl ether, diisopropyl ether, diethyl ether, diethylene glycol dimethyl ether, di-n-butyl ether, ethyl butyl ether, triethylene glycol, 1,2-dimethoxybenzene, ditetrahydrofurylpropane, ditetrahydrofurylpropane, ethyl tetrahydrofurfuryl ether, trimethylamine, triethylamine, and N,N,N,N-tetramethylethylenediamine, and is preferably tetrahydrofuran, ditetrahydrofurfurylpropane, ditetrahydrofurylpropane, or N,N,N,N-tetramethylethylenediamine, but the present invention is not limited thereto. A usage amount of the Lewis base may be adjusted in such a way that the vinyl content in the end-modified conjugated diene-based polymer obtained by the above method is adjusted in a range of 10 to 60%.

In the step (b), some ends of the living polymer synthesized in the step (a), specifically, 10 to 40% thereof may be reacted with a coupling agent to obtain a radial polymer. The coupling agent may be one or more selected from the group consisting of tin tetrachloride, silicon tetrachloride, and a silicon alkoxide, and is preferably tin tetrachloride, but the present invention is not limited thereto. After the step (b), the radial polymer produced by the coupling agent and the living polymer which did not participate in the coupling reaction after being synthesized in the step (a) may remain.

In the step (c), an end-modified conjugated diene-based polymer solution may be obtained by reacting the living polymer which did not participate in the coupling reaction in the step (b) with an equivalent amount of an organotin halide compound to modify the end of the living polymer. The end-modified conjugated diene-based polymer solution may include the radial polymer obtained in the step (b), the end-modified conjugated diene-based polymer, and the solvent used as a polymerization medium in the step (a).

The organotin halide compound may be one selected from the group consisting of trimethyltin chloride, dibutyltin dichloride, tributyltin chloride, and phenyltin trichloride, and is preferably dibutyltin dichloride, but the present invention is not limited thereto.

In addition, when the end of the living polymer is modified in the step (c), a reaction temperature may be 30 to 200° C., preferably, 50 to 110° C. When the reaction temperature is less than 30° C., the viscosity of a solution increases as the reaction is progressed, and thus a reaction rate may decrease, and when the reaction temperature is greater than 200° C., an end-modification effect resulting from the organotin halide compound may be insignificant due to the self-coupling reaction of the living polymer.

In the step (d), a rubber composition including an end-modified conjugated diene-based polymer and syndiotactic 1,2-polybutadiene may be obtained by adding a second catalyst and a conjugated diene-based monomer to the end-modified conjugated diene-based polymer solution to induce solution polymerization. Specifically, a rubber composition including an end-modified conjugated diene-based polymer and syndiotactic 1,2-polybutadiene may be obtained by removing the solvent used as a polymerization medium, after the solution polymerization.

The second catalyst may include an organoaluminum compound, a phosphorus compound, and a transition metal complex.

The organoaluminum compound may be one or more selected from the group consisting of trimethylaluminum, triethylaluminum, tripropylaluminum, tributylaluminum, triisobutylaluminum, trihexylaluminum, and diisobutylaluminum hydride, and is preferably triisobutylaluminum, but the present invention is not limited thereto.

In addition, the phosphorus compound may be a phosphite, a phosphate, or a mixture thereof. Examples of the phosphite include hydrogen diisopropyl phosphite, hydrogen diisobutyl phosphite, hydrogen dihexyl phosphite, hydrogen dioctyl phosphite, hydrogen dinonyl phosphite, hydrogen dicyclohexyl phosphite, triisopropyl phosphite, diisopropyloctyl phosphite, diisopropylnonyl phosphite, diisopropyldodecyl phosphite, dibutyloctyl phosphite, dibutylcyclohexyl phosphite, dibutylnonyl phosphite, dibutyldodecyl phosphite, tributyl phosphite, triisobutyl phosphite, trihexyl phosphite, trioctyl phosphite, bis(2-ethylhexyl) phosphite, and the like, but the present invention is not limited thereto. Also, examples of the phosphate include triphenyl phosphate, ethyl diphenyl phosphate, diethyl phenyl phosphate, triethyl phosphate, and the like, but the present invention is not limited thereto.

The transition metal complex may be an iron carboxylate or iron acetylacetonate. Examples of the iron carboxylate include iron (II) formate, iron (III) formate, iron (II) acetate, iron (III) acetate, iron (II) acrylate, iron (III) acrylate, iron (II) methacrylate, iron (III) methacrylate, iron (II) valerate, iron (III) valerate, iron (II) gluconate, iron (III) gluconate, iron (II) citrate, iron (III) citrate, iron (II) fumarate, iron (III) fumarate, iron (II) lactate, iron (III) lactate, iron (II) malate, iron (III) malate, iron (II) oxalate, iron (III) oxalate, iron (II) 2-ethylhexanoate, iron (III) 2-ethylhexanoate, iron (II) neodecanoate, iron (III) neodecanoate, iron (II) stearate, iron (III) stearate, iron (II) oleate, iron (III) oleate, iron (II) benzoate, iron (III) benzoate, iron (II) picolinate, iron (III) picolinate, and the like, but the present invention is not limited thereto.

The second catalyst may include 15 to 40 equivalents of the organoaluminum compound and 1 to 15 equivalents of the phosphorus compound with respect to 1 equivalent of the transition metal complex. When the components and composition ratio of the second catalyst do not satisfy the above ranges, a desired level of syndiotactic 1,2-polybutadiene properties may not be implemented.

In the step (d), the individual components included in the second catalyst may be separately added directly to a reactor, or the components may be completely or partially mixed with one another elsewhere and then added to the reactor. Also, when the components of the second catalyst are added to the reactor after being mixed elsewhere, a portion of the second catalyst may be added to the reactor first, and the remainder may be mixed and then added to the reactor. For example, 20 to 80 wt % of the total weight of the phosphorus compound used in the step (d) may be first added to the end-modified conjugated diene-based polymer solution obtained in the step (c), the remainder may be mixed with a solvent and a transition metal complex in a separate container to form a solution, and then the solution may be added to the end-modified conjugated diene-based polymer solution.

The rubber composition may include 60 to 90 wt % of an end-modified conjugated diene-based polymer and 10 to 40 wt % of syndiotactic 1,2-polybutadiene.

The end-modified conjugated diene-based polymer may be end-modified polybutadiene (e.g., 1,4-polybutadiene) or an end-modified styrene-butadiene copolymer.

The syndiotactic-1,2-polybutadiene may maintain the strength of the rubber composition at a predetermined level or more. Also, when the rubber composition is used in a combination with a filler, the syndiotactic-1,2-polybutadiene may contribute to lowering of the specific gravity of the blend, and thus the weight of a product manufactured using the blend may be reduced.

The vinyl content in the syndiotactic-1,2-polybutadiene may be about 70% or more, preferably, about 90% or more. Also, the syndiotactic-1,2-polybutadiene may have the degree of crystallinity of 30% or more, preferably, 40% or more. The syndiotactic-1,2-polybutadiene may have a melting point of 110 to 220° C., preferably, 140 to 180° C.

The syndiotactic-1,2-polybutadiene may be included at a content of 10 to 40 wt % with respect of the total weight of the rubber composition. When the content of the syndiotactic 1,2-polybutadiene is less than 10 wt %, the mechanical strength when the rubber composition is used in combination with a filler is low, and thus the amount of the filler needs to be increased as in the related art, resulting in an increase in the specific gravity of the blend and a degradation of fuel efficiency. On the other hand, when the content of the syndiotactic 1,2-polybutadiene is greater than 40 wt %, the viscosity of the polymer increases, and thus it is difficult to carry out solidifying and mixing processes.

Meanwhile, the steps (a) to (d) may be carried out in situ. In the method of preparing a rubber composition according to one aspect of the present invention, a functional group having affinity for a filler may be imparted to the end of a conjugated diene-based polymer, which is a base rubber, and an additional amount of a conjugated diene-based monomer may be polymerized in situ such that syndiotactic 1,2-polybutadiene is dispersed in the base rubber. That is, the solvent used as a medium in the polymerization and end modification of the living polymer in the steps (a) to (c) is not removed but subsequently used as a medium for the polymerization of syndiotactic 1,2-polybutadiene in the step (d), so that the dispersibility of an end-modified conjugated diene-based polymer and syndiotactic 1,2-polybutadiene, which are included in a finally prepared rubber composition, may be significantly improved, and the effect of each of them may be harmoniously implemented.

The in situ method is also referred to as a one-pot reaction and means a method in which, when a target compound is synthesized through a reaction consisting of two or more steps, only one reactor is used, and a product(s) (intermediate product(s)) obtained in each step is/are not isolated and purified but only additional reactant(s) required for the subsequent step is/are introduced into the one reactor until the target compound is finally obtained.

When the steps (a) to (d) are carried out in situ, it is possible to prevent a material from being lost due to the processes of isolating and purifying an intermediate product(s). Therefore, as long as by-products do not interfere with a reaction in the subsequent step, use of the in situ method may result in improved processing efficiency and yield compared to when a method of isolating and purifying an intermediate product(s) to use it/them for a subsequent step is employed.

Hereinafter, embodiments of the present invention will be described in detail.

Example 1

300 g of 1,3-butadiene, 2,800 g of n-heptane, and 0.3 g of tetrahydrofuran were put in a 10 L reactor, and the temperature inside the reactor was adjusted to 35° C. while stirring. When the temperature inside the reactor reached 35° C., 0.15 g (0.05 phm) of n-butyllithium as a polymerization initiator was put in the reactor, followed by an adiabatic heating reaction. After the polymerization of 1,3-butadiene was completed, 0.05 g of tin tetrachloride ($SnCl_4$) was added to induce a coupling reaction with 30% of the ends of a reaction product, and then 0.50 g (corresponding to an equivalent of the end of the reaction product remaining unreacted) of dibutyltin dichloride was added to prepare a first solution including end-modified 1,4-polybutadiene. 6.43 g of bis(2-ethylhexyl) phosphite was added to the first solution.

2.76 g of bis(2-ethylhexyl) phosphite, 1.46 g of iron (III) 2-ethylhexanoate, and n-heptane were mixed in a separate container to prepare a second solution. The second solution was put in the reactor and mixed with the first solution, 11.90 g of triisobutylaluminum was added, and then the temperature inside the reactor was adjusted to 60° C. When the temperature inside the reactor reached 60° C., additional 100 g of 1,3-butadiene was put in the reactor, followed by a polymerization reaction to prepare a third solution including end-modified 1,4-polybutadiene and syndiotactic 1,2-polybutadiene.

1.6 g of dibutyl hydroxytoluene was added to the third solution, and the resulting solution was dried with steam to remove heptane and then solidified to prepare a rubber composition in which syndiotactic 1,2-polybutadiene was dispersed in a matrix including end-modified 1,4-polybutadiene.

It was confirmed using a differential scanning calorimeter (DSC) that the melting point of syndiotactic 1,2-polybutadiene included in the solidified rubber composition was 169° C.

Example 2

70 g of styrene, 220 g of 1,3-butadiene, 2,800 g of n-heptane, and 5.6 g of tetrahydrofuran were put in a 10 L reactor, and the temperature inside the reactor was adjusted to 35° C. while stirring. When the temperature inside the reactor reached 35° C., 0.15 g (0.05 phm) of n-butyllithium as a polymerization initiator was put in the reactor, followed by an adiabatic heating reaction. When the reaction temperature reached the maximum temperature, additional 10 g of 1,3-butadiene was added to replace the end of a reaction product with butadiene. After the polymerization of 1,3-butadiene was completed, 0.05 g of tin tetrachloride ($SnCl_4$) was added to induce a coupling reaction with 30% of the end of a reaction product, and then 0.50 g (corresponding to an equivalent of the end of the reaction product remaining unreacted) of dibutyltin dichloride was added to prepare a first solution including end-modified styrene-butadiene copolymer. 6.43 g of bis(2-ethylhexyl) phosphite was added to the first solution.

2.76 g of bis(2-ethylhexyl) phosphite, 1.46 g of iron (III) 2-ethylhexanoate, and n-heptane were mixed in a separate container to prepare a second solution. The second solution was put in the reactor and mixed with the first solution, 11.90 g of triisobutylaluminum was added, and then the temperature inside the reactor was adjusted to 60° C. When the temperature inside the reactor reached 60° C., additional 100 g of 1,3-butadiene was put in the reactor, followed by a polymerization reaction to prepare a third solution including an end-modified styrene-butadiene copolymer and syndiotactic 1,2-polybutadiene.

1.6 g of dibutyl hydroxytoluene was added to the third solution, and the resulting solution was dried with steam to remove heptane and then solidified to prepare a rubber composition in which syndiotactic 1,2-polybutadiene was dispersed in a matrix including an end-modified styrene-butadiene copolymer.

It was confirmed using a differential scanning calorimeter (DSC) that the melting point of syndiotactic 1,2-polybutadiene included in the solidified rubber composition was 167° C.

Comparative Example 1

300 g of 1,3-butadiene, 2,800 g of n-heptane, and 0.3 g of tetrahydrofuran were put in a 10 L reactor, and the temperature inside the reactor was adjusted to 35° C. while stirring. When the temperature inside the reactor reached 35° C., 0.15 g (0.05 phm) of n-butyllithium as a polymerization initiator was put in the reactor, followed by an adiabatic heating reaction. After the polymerization of 1,3-butadiene was completed, 0.05 g of tin tetrachloride ($SnCl_4$) was added to induce a coupling reaction with 30% of the end of a reaction product, and then 0.36 g (corresponding to an equivalent of the end of the reaction product remaining unreacted) of dibutyl hydroxytoluene was added to prepare a first solution including 1,4-polybutadiene. 6.43 g of bis(2-ethylhexyl) phosphite was added to the first solution.

2.76 g of bis(2-ethylhexyl) phosphite, 1.46 g of iron (III) 2-ethylhexanoate, and n-heptane were mixed in a separate container to prepare a second solution. The second solution was put in the reactor and mixed with the first solution, 11.90 g of triisobutylaluminum was added, and then the temperature inside the reactor was adjusted to 60° C. When the temperature inside the reactor reached 60° C., additional 100 g of 1,3-butadiene was put in the reactor, followed by a polymerization reaction to prepare a third solution including 1,4-polybutadiene and syndiotactic 1,2-polybutadiene.

1.6 g of dibutyl hydroxytoluene was added to in the third solution, and the resulting solution was dried with steam to remove heptane and then solidified to prepare a rubber composition in which syndiotactic 1,2-polybutadiene was dispersed in a matrix including 1,4-polybutadiene.

It was confirmed using a differential scanning calorimeter (DSC) that the melting point of syndiotactic 1,2-polybutadiene included in the solidified rubber composition was 168° C.

Comparative Example 2

70 g of styrene, 220 g of 1,3-butadiene, 2,800 g of n-heptane, and 5.6 g of tetrahydrofuran were put in a 10 L reactor, and the temperature inside the reactor was adjusted to 35° C. while stirring. When the temperature inside the reactor reached 35° C., 0.15 g (0.05 phm) of n-butyllithium as a polymerization initiator was put in the reactor, followed by an adiabatic heating reaction. When the reaction temperature reached the maximum temperature, additional 10 g of 1,3-butadiene was added to replace the end of a reaction product with butadiene. After the polymerization of 1,3-butadiene was completed, 0.05 g of tin tetrachloride ($SnCl_4$) was added to induce a coupling reaction with 30% of the end of a reaction product, and then 0.36 g (corresponding to an equivalent of the end of the reaction product remaining unreacted) of dibutyl hydroxytoluene was added to prepare a first solution including a styrene-butadiene copolymer. 6.43 g of bis(2-ethylhexyl) phosphite was added to the first solution.

2.76 g of bis(2-ethylhexyl) phosphite, 1.46 g of iron (III) 2-ethylhexanoate, and n-heptane were mixed in a separate container to prepare a second solution. The second solution was put in the reactor and mixed with the first solution, 11.90 g of triisobutylaluminum was added, and then the temperature inside the reactor was adjusted to 60° C. When the temperature inside the reactor reached 60° C., additional 100 g of 1,3-butadiene was put in the reactor, followed by a polymerization reaction to prepare a third solution including a styrene-butadiene copolymer and syndiotactic 1,2-polybutadiene.

1.6 g of dibutyl hydroxytoluene was added to the third solution, and the resulting solution was dried with steam to remove heptane and then solidified to prepare a rubber composition in which syndiotactic 1,2-polybutadiene was dispersed in a matrix including a styrene-butadiene copolymer.

It was confirmed using a differential scanning calorimeter (DSC) that the melting point of syndiotactic 1,2-polybutadiene included in the solidified rubber composition was 167° C.

Comparative Example 3

300 g of 1,3-butadiene, 2,800 g of n-heptane, and 0.3 g of tetrahydrofuran were put in a 10 L reactor, and the temperature inside the reactor was adjusted to 35° C. while stirring. When the temperature inside the reactor reached 35° C., 0.15 g (0.05 phm) of n-butyllithium as a polymerization initiator was put in the reactor, followed by an adiabatic heating reaction. After the polymerization of 1,3-butadiene was completed, 0.05 g of tin tetrachloride ($SnCl_4$) was added to induce a coupling reaction with 30% of the end of a reaction product, and then 2.0 g of dibutyl hydroxytoluene was added. Afterward, the resulting solution was dried with steam to remove heptane and then solidified to prepare a rubber composition including 1,4-polybutadiene.

Comparative Example 4

70 g of styrene, 220 g of 1,3-butadiene, 2,800 g of n-heptane, and 5.6 g of tetrahydrofuran were put in a 10 L reactor, and the temperature inside the reactor was adjusted to 35° C. while stirring. When the temperature inside the reactor reached 35° C., 0.15 g (0.05 phm) of n-butyllithium as a polymerization initiator was put in the reactor, followed by an adiabatic heating reaction. When the reaction temperature reached the maximum temperature, additional 10 g of 1,3-butadiene was added to replace the end of a reaction product with butadiene. After the polymerization of 1,3-butadiene was completed, 0.05 g of tin tetrachloride ($SnCl_4$) was added to induce a coupling reaction with 30% of the end of a reaction product, and then 2.0 g of dibutyl hydroxytoluene was added. Afterward, the resulting solution was dried with steam to remove heptane and then solidified to prepare a rubber composition including a styrene-butadiene copolymer.

Preparation Examples and Comparative Preparation Examples

Each of the rubber compositions according to Examples 1 and 2 and Comparative Examples 1 to 4, a natural rubber, carbon black, zinc oxide, stearic acid, an antioxidant, sulfur, and a vulcanization accelerator were mixed together and stirred to prepare a blend. The blends including the rubber compositions according to Examples 1 and 2 and Comparative Examples 1 to 4 were named Preparation Examples 1 and 2 and Comparative Preparation Examples 1 to 4, respectively, and the composition of each blend is shown in the following Table 1.

TABLE 1

| Composition | Preparation Example 1 | Preparation Example 2 | Comparative Preparation Example 1 | Comparative Preparation Example 2 | Comparative Preparation Example 3 | Comparative Preparation Example 4 |
|---|---|---|---|---|---|---|
| Natural rubber | 50 | | 50 | | 50 | |
| Example 1 | 50 | | | | | |
| Example 2 | | 100 | | | | |
| Comparative Example 1 | | | 50 | | | |
| Comparative Example 2 | | | | 100 | | |
| Comparative Example 3 | | | | | 50 | |
| Comparative Example 4 | | | | | | 100 |
| Carbon black | 42 | 35 | 42 | 35 | 60 | 50 |
| Zinc oxide | 3 | 3 | 3 | 3 | 3 | 3 |
| Stearic acid | 2 | 1 | 2 | 1 | 2 | 1 |
| Antioxidant | 1.5 | 1.5 | 1.5 | 1.5 | 1.5 | 1.5 |
| Sulfur | 1.5 | 1.75 | 1.5 | 1.75 | 1.5 | 1.75 |
| Vulcanization accelerator | 1.5 | 1 | 1.5 | 1 | 1.5 | 1 |

(units: parts by weight)

Experimental Examples

1. Mooney Viscosity (cps)

30 g of each of the blends according to Preparation Examples 1 and 2 and Comparative Preparation Examples 1 to 4 was pressed using a roller to prepare two samples with a thickness of 8 mm and an area of 5 cm×5 cm. The two samples were adhered to the front and rear of a rotor, and a rotational viscometer (MV 2000 Mooney Viscometer commercially available from Alpha Technologies) was used. The rotor was mounted on the rotational viscometer, and the rotor was operated after preheating to 100° C. for the first 1 minute to measure a change in viscosity of the blend for 4 minutes of operation, thereby obtaining a Mooney viscosity indicated by $ML_{1+4}$ (100° C.).

2. Other Properties

Each of the blends according to Preparation Examples 1 and 2 and Comparative Preparation Examples 1 to 4 was subjected to roll mixing milling at 80° C. using a roll mill, processed into a flat sheet form on a roll with a thickness of 2 mm, and then maintained for 24 hours. Afterward, the resulting flat sheet was subjected to vulcanization using a press at 160° C. for a crosslinking time measured in a rubber process analyzer (RPA) to prepare a sheet sample with a thickness of 2 mm.

The mechanical/dynamic properties of the sheet samples were measured and compared, the results of which are shown in the following Table 2. The measurement methods of properties are as follows.

Hardness: measured in accordance with ASTM (Shore A)

300% modulus: determined by measuring stress which is being applied to the sample at the time of sample elongation by 300% at 25° C. (units: $kgf/cm^2$)

Tensile strength: measured in accordance with ASTM D790 (units: $kgf/cm^2$)

Elongation rate: determined by measuring the strain value (in %) until the sample is broken using a tensile testing machine.

Tan δ: measured by carrying out a temperature sweep at 60° C. using a dynamic mechanical thermal analyzer (DMTA)

TABLE 2

| Classification | Preparation Example 1 | Preparation Example 2 | Comparative Preparation Example 1 | Comparative Preparation Example 2 | Comparative Preparation Example 3 | Comparative Preparation Example 4 |
|---|---|---|---|---|---|---|
| Mooney viscosity | 75 | 90 | 76 | 92 | 87 | 105 |
| Hardness | 70 | 65 | 70 | 65 | 69 | 66 |
| 300% modulus | 174.4 | 146.2 | 172.5 | 145.1 | 172.5 | 144.0 |
| Tensile strength | 243.4 | 212.3 | 242.5 | 210.9 | 240.3 | 209.0 |
| Elongation rate | 445.6 | 411.5 | 446.5 | 416.7 | 420.2 | 388.0 |
| Tan δ (60° C.) | 0.0786 | 0.0762 | 0.0865 | 0.0847 | 0.0943 | 0.0955 |
| Specific gravity | 1.083 | 1.068 | 1.084 | 1.069 | 1.131 | 1.121 |

Referring to Table 2, it can be seen that Preparation Examples 1 and 2, in which a rubber composition including an end-modified conjugated diene-based polymer and syndiotactic 1,2-polybutadiene is used, exhibited a low Tan δ (60° C.) value compared to Comparative Preparation Examples 1 and 2 including a conjugated diene-based polymer whose end was not modified, indicating that the blends according to Preparation Examples 1 and 2 can be used to produce a tire with improved fuel efficiency. Also, since such a tire may exhibit a low specific gravity as well as excellent fuel efficiency compared to those according to Comparative Preparation Examples 3 and 4, which include a larger amount of carbon black to maintain strength of the rubber composition by compensating for not including syndiotactic 1,2-polybutadiene, and thus it is expected that it is possible to implement a tire with reduced weight and, accordingly, a lighter vehicle.

In a method of preparing a rubber composition according to one aspect of the present invention, a functional group having affinity for a filler is imparted to the end of a conjugated diene-based polymer, which is a base rubber, and an additional amount of butadiene is polymerized in situ such that syndiotactic 1,2-polybutadiene is dispersed in the base rubber, and thereby the rubber composition is easily dispersed and processed.

In addition, since the crystallinity of syndiotactic 1,2-polybutadiene contributes to the strength of a product, when it is necessary to blend the rubber composition and a reinforcing filler, for example, when a tire is manufactured, a usage amount of the reinforcing filler can be reduced, and fuel efficiency of the product can be improved due to lower rolling resistance with the same level of strength.

Additionally, since syndiotactic 1,2-polybutadiene dispersed in the base rubber has a specific gravity lower than that of the reinforcing filler, it is possible to partially replace the reinforcing filler with syndiotactic 1,2-polybutadiene so that the weight of the tire can be reduced, and thus the fuel efficiency of the tire can be further improved.

Effects of the present invention are not limited to the above-described effects and it should be understood that all effects that can be inferred from a configuration of the invention disclosed in the detailed descriptions or claims of the present invention are encompassed.

The above description of the present invention is only exemplary, and it will be understood by those skilled in the art that various modifications can be made without departing from the scope of the present invention and changing essential features. Therefore, the above-described embodiments should be considered as only illustrative in all aspects and not for purposes of limitation. For example, each component described as a single body may be realized in a distributed manner, and similarly, components that are described as being distributed may be realized in a combined manner.

The scope of the present invention is defined by the appended claims, and encompasses all modifications and alterations derived from meanings, the scope and equivalents of the appended claims.

What is claimed is:

1. A method of preparing a rubber composition, comprising:
   (a) synthesizing a living polymer by solution polymerization of a monomer mixture including a conjugated diene-based monomer in the presence of a first catalyst;
   (b) reacting some ends of the living polymer with a coupling agent;
   (c) reacting the remaining ends of the living polymer with an organotin halide compound to prepare an end-modified conjugated diene-based polymer solution; and
   (d) adding a second catalyst and a conjugated diene-based monomer to the end-modified conjugated diene-based polymer solution to induce solution polymerization.

2. The method of claim 1, wherein the conjugated diene-based monomer is one or more selected from the group consisting of 1,3-butadiene, 2,3-dimethyl-1,3-butadiene, piperylene, 3-butyl-1,3-octadiene, isoprene, and 2-phenyl-1,3-butadiene.

3. The method of claim 1, wherein the monomer mixture further includes an aromatic vinyl monomer.

4. The method of claim 3, wherein the aromatic vinyl monomer is one or more selected from the group consisting of styrene, α-methylstyrene, 3-methylstyrene, 4-methylstyrene, 2,4-dimethylstyrene, 2,4-diisopropylstyrene, 4-propylstyrene, 1-vinylnaphthalene, 4-cyclohexylstyrene, 4-(p-methylphenyl)styrene, N,N-dimethylaminoethylstyrene, and 1-vinyl-5-hexylnaphthalene.

5. The method of claim 1, wherein the first catalyst is one or more selected from the group consisting of an organolithium compound, an organosodium compound, an organopotassium compound, an organorubidium compound, and an organocesium compound.

6. The method of claim 1, wherein, in the step (b), 10 to 40% of the ends of the living polymer are reacted with the coupling agent.

7. The method of claim 1, wherein the coupling agent is one or more selected from the group consisting of tin tetrachloride, silicon tetrachloride, and a silicon alkoxide.

8. The method of claim 1, wherein the organotin halide compound is one or more selected from the group consisting of trimethyltin chloride, dibutyltin dichloride, tributyltin chloride, and phenyltin trichloride.

9. The method of claim 1, wherein the second catalyst includes an organoaluminum compound, a phosphorus compound, and a transition metal complex.

10. The method of claim 9, wherein the second catalyst includes 15 to 40 equivalents of the organoaluminum compound and 1 to 15 equivalents of the phosphorus compound with respect to 1 equivalent of the transition metal complex.

11. The method of claim 9, wherein the organoaluminum compound is one or more selected from the group consisting of trimethylaluminum, triethylaluminum, tripropylaluminum, tributylaluminum, triisobutylaluminum, trihexylaluminum, and diisobutylaluminum hydride.

12. The method of claim 9, wherein the phosphorus compound is a phosphite, a phosphate, or a mixture thereof.

13. The method of claim 9, wherein the transition metal complex is an iron carboxylate or iron acetylacetonate.

14. The method of claim 1, wherein the steps (a) to (d) are carried out in situ.

15. The method of claim 1, wherein a product of the step (d) includes 60 to 90 wt % of an end-modified conjugated diene-based polymer and 10 to 40 wt % of syndiotactic 1,2-polybutadiene.

* * * * *